United States Patent [19]

McCullough et al.

[11] 4,168,031
[45] Sep. 18, 1979

[54] THRUST CONTROL NOZZLE FOR ROCKETS

[75] Inventors: Edward E. McCullough, Brigham City; William G. Ramroth, Ogden, both of Utah

[73] Assignee: Thiokol Corporation, Newtown, Pa.

[21] Appl. No.: 179,791

[22] Filed: Sep. 13, 1971

[51] Int. Cl.² .......................................... B63H 11/10
[52] U.S. Cl. ........................ 239/265.19; 239/265.35
[58] Field of Search ................ 239/265.11, 265.19, 239/265.35; 60/232, 271

[56] References Cited

U.S. PATENT DOCUMENTS

| | | | |
|---|---|---|---|
| 2,857,119 | 10/1958 | Morguloff | 239/265.19 X |
| 2,987,879 | 6/1961 | Brown | 239/265.19 X |
| 3,096,616 | 7/1963 | Edman | 60/232 |
| 3,130,544 | 4/1964 | Penza | 239/265.19 |
| 3,332,243 | 6/1967 | Wilson | 239/265.11 X |
| 3,358,453 | 12/1967 | Swet | 60/232 X |
| 3,392,918 | 7/1968 | Goldberg | 60/232 X |
| 3,402,894 | 9/1968 | Wynosky et al. | 239/265.19 X |
| 3,504,902 | 4/1970 | Irwin | 239/265.35 X |
| 3,659,789 | 5/1972 | Schultz | 239/265.19 |
| 3,727,843 | 4/1973 | Parilla | 239/265.35 |

Primary Examiner—John J. Love
Attorney, Agent, or Firm—Stanley A. Marcus; Edward E. McCullough

[57] ABSTRACT

The cowl of a spike nozzle is attached to the inside of the aft closure of a rocket case by means that allow it to rotate about a fixed point. Fluid-operated actuators mounted in the aft closure bear against the cowl to effect changes in the direction of thrust. Optionally, the spike may be attached to its cowl by fluid-operated actuators to modulate thrust.

1 Claim, 4 Drawing Figures

THRUST CONTROL NOZZLE FOR ROCKETS

BACKGROUND OF THE INVENTION

Spike or plug nozzles for rockets have long been known to have certain desirable characteristics for rocket propulsion. For example, they tend to be efficient over a greater altitude range than the conventional convergent-divergent type of nozzle; and they can be made to be much shorter in an axial direction, so that considerably more propellant can be packed into a rocket of a given length. Hence, by use of such a nozzle, a more powerful rocket can be made to fit into the allotted space in submarines and silos.

However, a long standing problem relating to use of spike nozzles has been means of controlling thrust of a rocket of steering, velocity control, and extinguishment of propellant for on-off operation.

SUMMARY OF THE INVENTION

The present invention, which is directed toward solving this problem, features a spike nozzle member with its annular cowl mounted to the inside of a rocket case by gas-tight pivoting, retaining means that allows it to rotate about a fixed point on the axis of the rocket. Fluid operated actuators mounted in the rocket case bear against the cowl to rotate the nozzle and change direction of thrust when desired.

Optionally, the spacing means that forms an annular throat between the cowling and the spike member may be fluid-operated actuators, so that the spike nozzle member may be moved axially relative to the cowling, thereby changing the size of the annular throat to modulate thrust of the rocket. Such action may also be used to lower or raise the rocket chamber pressure suddenly for propellant extinguishment in solid propellant rockets having on-off capability.

Objects of the invention are to provide a spike nozzle for rockets that has the capability of changing the direction of thrust of a rocket, modulating the thrust, and altering the chamber pressure thereof. Important features of the invention are that it is simple, compact, reliable in construction, and permits loading of a greater quantity of propellant into a rocket of a given size.

Other objects and advantages of the invention will become apparent as the following detailed description is read with reference to the accompanying drawings, wherein the same parts are designated by identical numbers throughout the disclosure.

DESCRIPTION OF THE PREFERRED EMBODIMENTS

Figure 1:
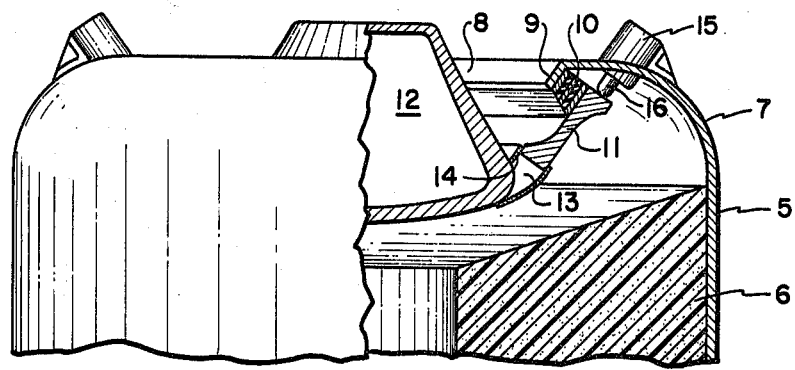
FIG. 1 is a longitudinal section of a first embodiment of the invention.

In the first embodiment of the invention shown in FIG. 1, the rocket case 5 containing a propellant grain 6, has an aft closure dome 7 with a large, central opening 8. An annular flange 9 on the aft closure 7 extends inwardly, and defines the opening 8. An annular, flexible bearing 10, is made of alternate laminae of steel and rubber stacked and bonded together, that conform to spherical surfaces concentric about a point P of rotation on the axis of the rocket.

The outer, concave side of the flexible bearing 10 is bonded to the inside of the annular flange 9. The inner convex side of the flexible bearing 10 is bonded to the cowl 11 of a spike nozzle member 12. Single action, hydraulic actuators 15, radially oriented and circumferentially spaced on the rocket case 6 have driving arms 16 in contact with the outer edge of the cowl 11, so that they may rotate the cowl 11 and the spike nozzle member 12 about the point P of rotation. The cowl 11 is spaced from the spike nozzle member 12 to form an annular throat 13 by a plurality of radial brackets 14.

Figure 4:
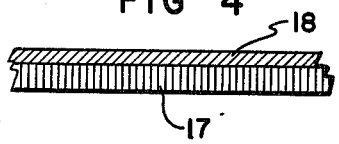
FIG. 4 is a fragmentary section showing nozzle wall structure.

The structure of the cowl 11 is fairly well known in the art and may be made of refractory material such as graphite supported on a steel annulus. The brackets 14 may be similarly made, or of some refractory metal such as tungsten. The spike nozzle member 12 is hollow, and its walls may be constructed similarly to those of the well-known de Laval nozzles. As shown in FIG. 4, an inner backing 17 of radially-oriented, metallic honeycomb structure is bonded to an outer layer 18 of carbon cloth impregnated with phenolic resin. Other materials, such as glass fibers impregnated with thermosetting resins and graphite have been found useful for this purpose.

In this embodiment of the invention, the cowl 11 and the spike nozzle member 12 are fixed together by the brackets 14 and move as a unit when rotated by the actuators 15. These actuators 15 are responsive to mechanisms well known in the art for steering a rocket along a prescribed trajectory.

Figure 2:
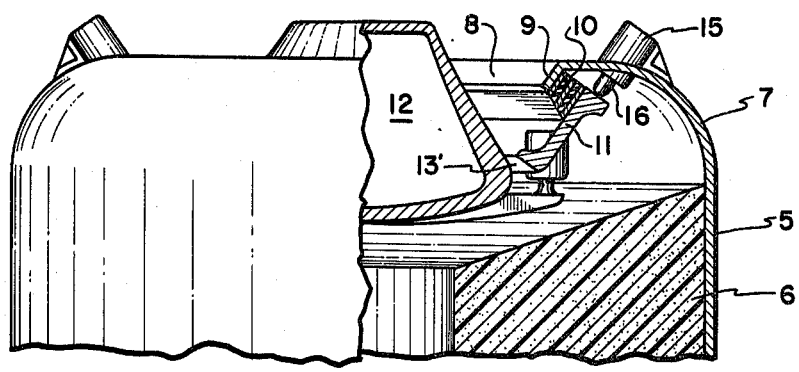
FIG. 2 is similar to FIG. 1 but shows a second embodiment of the invention.

The embodiment of the invention shown in FIG. 2 is identical to that shown in FIG. 1 except that the brackets 14 are eliminated and the spike nozzle member 12 is attached to its cowl 11 by a plurality of double acting, hydrualic actuators 19. By this means, the annular throat orifice 13' may be altered in size to regulate thrust or to change the chamber pressure of the rocket as desired; so that the rocket may be slowed, accelerated, or extinguished.

Figure 3:
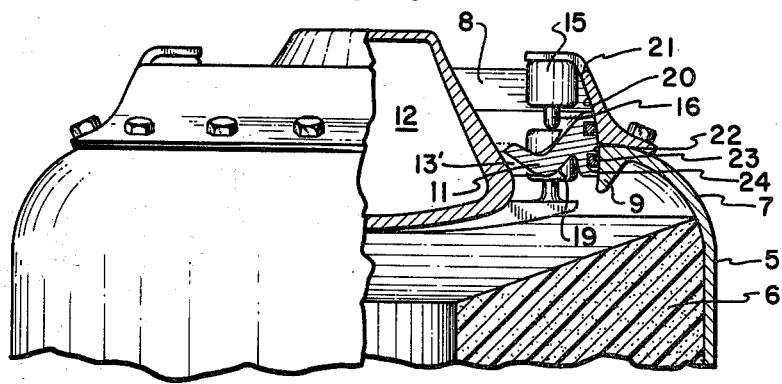
FIG. 3 is also similar to FIG. 1 showing a third embodiment of the invention.

The embodiment of the invention shown in FIG. 3 is the same as that shown in FIG. 2 except that the cowl 11' is retained in the aft closure 7' of the rocket by a different means. The inwardly extending flange 9' forms a concave spherical surface 20 about the point P of rotation on the axis of the rocket. This partial-spherical surface 20 is extended externally of the rocket by retaining ring 21 that forms an externally extending flange. The outer portion of the cowl 11' is thickened to present a wider, partial convex, spherical surface containing at least one rubber O-ring 23, seated in an annular groove 24, to form an annular gas tight seal between the spherical surfaces 20 and 22. Two such O-rings 23 and grooves 24 are shown in FIG. 3. The O-rings 23 may alternatively be seated in grooves in the surface 20. This embodiment of the invention functions in a manner identical to that of FIG. 2; and is useful in smaller, less powerful rockets requiring rapid response and relatively great angles of rotation for the nozzle 12.

An invention has been described that teaches an advance in the art of rocket technology. Although the embodiments have been described in rather specific detail, it should be noted that many such details may be altered without departing from the scope of the invention as defined in the following claims.

We claim:

1. Thrust nozzle apparatus for a rocket having a case, propellant therein, and an aft closure with an opening, comprising:
 a spike nozzle member;
 an annular cowl surrounding the spike nozzle member;
 a plurality of double-acting, hydraulic cylinders fixed to the cowl and having actuation arms attached to the nozzle member for spacing it from the cowl to form a throat and for moving it axially relative to the cowl, whereby the throat area of the nozzle may be regulated;
 an annular, flexible bearing made of rigid and elastomeric laminae alternately stacked and bonded together and conforming to spherical surfaces concentric about a point of rotation, so that the bearing has a concave side bonded to the inside of the aft closure surrounding the opening thereof and a convex side bonded to the cowl; and
 a plurality of hydrualic actuators fixed to the aft closure adjacent the opening therein and equally spaced circumferentially about the cowl to bear against it and move it about the point of rotation for altering the direction of thrust of the rocket.

* * * * *